United States Patent
Nandy et al.

(10) Patent No.: US 9,076,447 B2
(45) Date of Patent: Jul. 7, 2015

(54) ACOUSTIC ACTIVITY DETECTION APPARATUS AND METHOD

(71) Applicant: Knowles Electronics LLC, Itasca, IL (US)

(72) Inventors: Dibyendu Nandy, Naperville, IL (US); Yang Li, Elk Grove Village, IL (US); Henrick Thomsen, Holte (DK); Claus Furst, Roskilde (DK)

(73) Assignee: KNOWLES ELECTRONICS, LLC, Itasca, IL (US)

( * ) Notice: Subject to any disclaimer, the term of this patent is extended or adjusted under 35 U.S.C. 154(b) by 0 days.

(21) Appl. No.: 14/522,129

(22) Filed: Oct. 23, 2014

(65) Prior Publication Data

US 2015/0112673 A1    Apr. 23, 2015

Related U.S. Application Data (63) Continuation of application No. 14/512,877, filed on Oct. 13, 2014.

(60) Provisional application No. 61/892,755, filed on Oct. 18, 2013.

(51) Int. Cl.
  *G10L 15/00* (2013.01)
  *G10L 15/20* (2006.01)

(52) U.S. Cl.
  CPC .................................... *G10L 15/20* (2013.01)

(58) Field of Classification Search
  CPC .... G10L 25/84; G10L 25/76; G10L 2025/783
  USPC ........................................................ 704/233
  See application file for complete search history.

(56) References Cited

U.S. PATENT DOCUMENTS

| | | |
|---|---|---|
| 5,983,186 A | 11/1999 | Miyazawa et al. |
| 6,453,020 B1 * | 9/2002 | Hughes et al. ............. 379/88.04 |
| 7,936,293 B2 * | 5/2011 | Hamashita ..................... 341/143 |
| 2002/0116186 A1 * | 8/2002 | Strauss et al. ................. 704/233 |
| 2002/0184015 A1 * | 12/2002 | Li et al. .......................... 704/233 |
| 2003/0144844 A1 | 7/2003 | Colmenarez et al. |
| 2010/0128894 A1 | 5/2010 | Petit et al. |
| 2011/0007907 A1 * | 1/2011 | Park et al. .................... 381/71.8 |
| 2011/0106533 A1 | 5/2011 | Yu |
| 2012/0232896 A1 * | 9/2012 | Taleb et al. ................... 704/233 |
| 2015/0049884 A1 | 2/2015 | Ye |

OTHER PUBLICATIONS

"MEMS technologies: Microphone" EE Herald Jun. 20, 2013.*
Delta-sigma modulation, Wikipedia (Jul. 4, 2013).*
Pulse-density modulation, Wikipedia (May 3, 2013).*

(Continued)

*Primary Examiner* — Vincent P Harper
(74) *Attorney, Agent, or Firm* — Fitch, Even, Tabin & Flannery LLP (57) ABSTRACT

Streaming audio is received. The streaming audio includes a frame having plurality of samples. An energy estimate is obtained for the plurality of samples. The energy estimate is compared to at least one threshold. In addition, a band pass estimate of the signal is determined. An energy estimate is obtained for the band-passed plurality of samples. The two energy estimates are compared to at least one threshold each. Based upon the comparison operation, a determination is made as to whether speech is detected.

13 Claims, 4 Drawing Sheets

(56) References Cited

OTHER PUBLICATIONS

Kite, Understanding PDM Digital Audio, Audio Precision, Beaverton, OR, 2012.*

International Search Report and Written Opinion for PCT/US2014/060567 dated Jan. 16, 2015 (12 pages).

* cited by examiner

ACOUSTIC ACTIVITY DETECTION APPARATUS AND METHOD

CROSS REFERENCE TO RELATED APPLICATION

This application is a continuation of prior U.S. application Ser. No. 14/512,877, entitled "Acoustic Activity Detection Apparatus and Method," filed Oct. 13, 2014, which claims the benefit under 35 U.S.C. §119 (e) to U.S. Provisional Application No. 61/892,755, filed Oct. 18, 2013, the content of both applications is incorporated herein by reference in its entirety.

TECHNICAL FIELD

This application relates to speech interfaces and, more specifically, to activity detection approaches utilized in these applications.

BACKGROUND OF THE INVENTION

Speech interfaces have become important features in mobile devices today. Some devices have the capability to respond to speech even when the device's display is off and in some form of low power mode and potentially at some distance from the user. These requirements place significant demands on system design and performance including the need to keep the microphone in an "always listening" mode.

In other examples, the device keeps only parts of the signal chain powered up, e.g. the microphone and a digital signal processor (DSP) or central processing unit (CPU), with an algorithm for detecting a "voice trigger." Upon recognizing a voice trigger, the rest of the system is powered up from its sleep mode to perform the desired computational task.

The above-mentioned previous approaches suffer from several disadvantages. For example, these approaches tend to utilize or waste much power. This waste of power reduces the battery life of such systems. In other examples, the system may suffer from performance issues. These and other disadvantages have resulted in some user dissatisfaction with these previous approaches.

BRIEF DESCRIPTION OF THE DRAWINGS

For a more complete understanding of the disclosure, reference should be made to the following detailed description and accompanying drawings wherein.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION

Approaches are provided for a digital microphone with the built-in capability to distinguish speech and speech-like acoustic activity signals from background noise, to trigger a following digital signal processor (DSP) (or other) module or system, and to provide continuous audio data to the system for detection of a "voice trigger" followed by seamless operation of speech recognition engines. The ability to distinguish speech activity from background allows the following modules in the signal chain to operate in low power "sleep" states, conserving battery power until their operation is required.

To enable such capabilities, a low complexity Acoustic Activity Detection (AAD) module is configured to detect speech with low latency and high probability in high ambient noise. The high noise results in speech signal-to-noise ratios (SNRs) as low as approximately 0 dB. In addition, the present approaches provide a built-in buffer for seamless handover of audio data to the following "voice trigger" detector as well as for the general purpose automatic speech recognizer (ASR) following the voice trigger. The AAD module may be implemented as any combination of computer hardware and software. In one aspect, it may be implemented as computer instructions executed on a processing device such as an application specific integrated circuit (ASIC) or microprocessor. As described herein, the AAD module transforms input signals into control signals that are used to indicate speech detection.

Lower power can be achieved by optimized approaches which can detect speech audio activity with low latency, low computational cost (silicon area), high detection rates and low rate of false triggers. In some aspects, the present approaches utilize a buffer of sufficient depth to store the recorded data for the multi-layered recognition system to work seamlessly and without pauses in speech.

In many of these embodiments, streaming audio is received and the streaming audio comprising a sequence of frames, each having a plurality of samples. An energy estimate is obtained for the plurality of samples. The energy estimate is compared to at least one threshold. Based upon the comparing, a determination is made as to whether speech is detected.

In other aspects, a determination is made as to whether a speech hangover has occurred. In some examples, a non-linear process is used to make the hangover determination. In other examples and when speech is not detected, a determination is made as to the noise level of the plurality of samples.

In others of these embodiments, streaming audio is received, and the streaming audio comprises a sequence of frames, each with a plurality of samples. A first energy estimate is obtained for the frame of the plurality of samples and a second energy estimate is obtained for the band passed signal from the same frame of the plurality of samples. In a first path, the first energy estimate is compared to at least one first threshold and based upon the comparing, a determination is made as to whether speech is detected. In a second path that is performed in parallel with the first path, the second energy estimate is compared to at least one second threshold and based upon the comparing, a determination is made as to whether speech is detected.

In other aspects, a determination is made as to whether a speech hangover has occurred. In some examples, a non-linear process is used to make the hangover determination. In other examples and when speech is not detected, a determination is made as to the noise level of the plurality of samples.

In others of these embodiments, an apparatus configured to distinguish speech activity from background noise includes an analog sub-system, a conversion module, and a digital sub-system. The analog sub-system converts sound energy into an analog electrical signal. The conversion module is coupled to the analog system and converts the analog signal into a digital signal.

The digital sub-system is coupled to the conversion module, and includes an acoustic activity detection (AAD) module. The AAD module is configured to receive the digital signal. The digital signal comprises a sequence of frames, each having a plurality of samples. The AAD module is configured to obtain an energy estimate for the plurality of samples and compare the energy estimate to at least one threshold. The AAD module is configured to based upon the comparison, determine whether speech is detected, and when speech is detected transmit an interrupt to a voice trigger module.

In other aspects, the analog sub-system includes a micro-electro-mechanical system (MEMS) transducer element. In other examples, the AAD module is further configured to determine whether a speech hangover has occurred. In yet other aspects, the AAD module enables the transmission of the digital signal by a transmitter module upon the detection of speech.

In other examples, the conversion module comprises a sigma-delta modulator that is configured to convert the analog signal into a single bit stream pulse density modulated (PDM) format. In some examples, the digital subsystem comprises a decimator module that converts the single bit stream pulse density modulated (PDM) format into a pulse code modulated (PCM) format. In other approaches, the pulse code modulated (PCM) audio from the decimator module is stored continuously in a circular buffer and in parallel, also provided to the AAD module for processing.

In some examples, the AAD module enables the transmission of the digital signal by a transmitter module upon the detection of speech. The transmitter module comprises a interpolator and digital sigma-delta modulator, that converts the pulse code modulated (PCM) format back to a single bit stream pulse density modulated (PDM) format.

Figure 1:
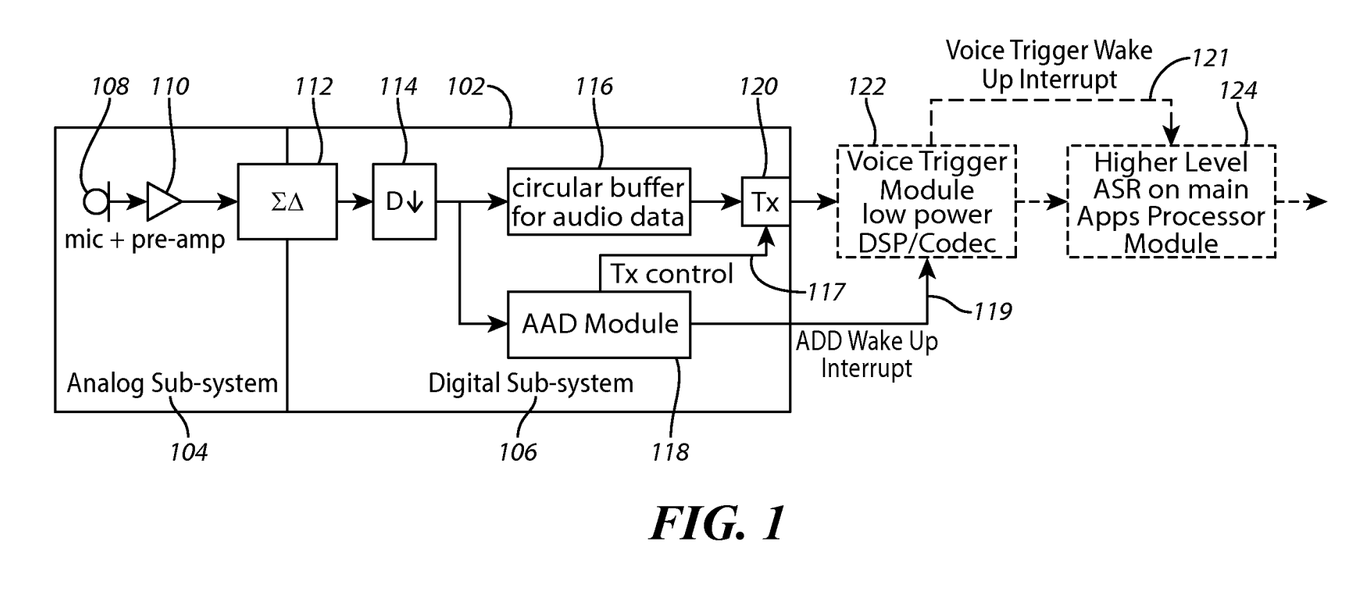
FIG. 1 comprises a block diagram of a system or apparatus using an Acoustic Activity Detection (AAD) module according to various embodiments of the present invention.

Referring now to FIG. 1, one example of an apparatus or system that is configured to distinguish speech activity from background noise, to trigger a following DSP (or other) system, and to provide continuous audio data to the system for detection of a "voice trigger" followed by seamless operation of speech recognition engines is described. A sub-system assembly 102 includes an analog subsystem 104 and a digital subsystem 106. The analog subsystem includes a microphone 108, a preamplifier (preamp) 110, and a Sigma-Delta (ΣΔ) modulator 112. The digital subsystem includes a decimator 114, a circular buffer 116, an Acoustic Activity Detection (AAD) module 118, and a transmitter 120. A voice trigger module 122 couples to a higher level ASR main applications processor 124. It will be appreciated that the AAD module 118, voice trigger module 122, and high-level ASR main applications processor module 124 may be implemented as any combination of computer hardware and software. For example, any of these elements may be implemented as executable computer instructions that are executed on any type of processing device such as an ASIC or microprocessor.

The microphone device 108 may be any type of microphone that converts sound energy into electrical signals. It may include a diaphragm and a back plate, for example. It also may be a microelectromechanical system (MEMS) device. The function of the preamplifier 110 is to provide impedance matching for the actual transducer and sufficient drive capability for the microphone analog output.

The sub-system 102 is always listening for acoustic activity. These system components are in typically in a low power mode to conserve battery life. The analog sub-system 104 consists of the microphone 108 and the pre-amplifier 110. The pre-amplifier 110 feeds into the Sigma-Delta (ΣΔ) modulator 112, which converts analog data to a single bit-stream pulse density modulated (PDM) format. Further, the output of the Sigma-Delta modulator 112 feeds into the decimator 114, which converts the PDM audio to pulse code modulated (PCM) waveform data at a particular sampling rate and bit width. The data is stored via optimal compressive means in the circular buffer 116 of a desired length to allow seamless non-interrupted audio to the processing blocks upstream. The compressed PCM audio data is further reconverted to PDM for the upstream processing block, when that data is required. This is controlled by the transmitter (Tx) 120. The data transmission occurs after the acoustic activity is detected.

When the AAD module 118 detects speech like acoustic activity (by examining a frame of data samples or some other predetermined data element), it sends an interrupt signal 119 to the voice trigger module 122 to wake-up this module and a control signal to the transmitter (Tx) 120 to output audio data. Once the voice trigger module is operational, it runs an algorithm to detect the voice trigger. If a voice trigger is detected, then the higher level ASR main applications processor module 124 is brought out of sleep mode with an interrupt 121 from the voice trigger block 122 as shown. If the AAD module 118 triggers the transmit data using Tx control 117 and consequently detects frames with non-speech data for a preset amount of relatively long time, it can turn off the transmitter 120 to signal the voice trigger module 122 to go back to sleep mode to reduce power consumption.

It will be appreciated that there exist latencies associated with a multilayered speech recognition system as described above. These include a latency for acoustic activity detection, a delay for wake-up of the voice-trigger module 122, a latency for "voice trigger" detection, and delay for wake-up of high-level ASR main applications processor module 124.

There may also be a need for priming the various processing blocks with audio data. The voice trigger module 122 requires audio data from before the acoustic activity detection trigger, i.e. before this block is woken-up from its sleep mode. The high-level ASR main applications processor module 124 requires audio data from before it is brought out of sleep mode. The requirements for audio data before the actual speech onset by both, the voice trigger module 122 and the high-level ASR main applications processor module 124 as well as the latencies of the AAD module 118 (and the "voice trigger" algorithm it implements), requires the use of the buffer 116, which has sufficient depth to allow recognition of speech that follows the "voice trigger" phrase in a seamless manner (without artificial pauses in speech). This is implemented in the circular buffer 116 as shown and described herein.

One advantage of the present approaches is that they do not miss speech onset and have a very low latency for detection. This leads to better performance of the "voice trigger" while reducing the buffer depth size as much as possible. Another goal is to reduce false detects of speech to avoid turning on the "voice trigger" algorithm unnecessarily and thus reducing battery life. In one aspect, the AAD module 118 provides (or helps provide) these results.

The operation of the AAD module 118 is based on frame-by-frame decision making by comparing an energy estimate of the audio signal samples in a frame of audio data to various thresholds for speech and noise. In these regards, a fast time constant based energy measure is estimated. The energy measure is designed to track the speech envelope with low latency. Thresholds for noise and speech levels are computed using energy statistics. The module 118 calculates the speech onset threshold by determining when the energy estimator exceeds a threshold.

Additionally, a band pass module of a similar structure may be introduced to capture fast energy variations occurring in the 2 kHz-5 kHz frequency range. This band pass module improves the detection levels of speech starts with non-vocal fricatives and sibilants. The use of this additional feature is described below with respect to FIG. 3.

Figure 2:
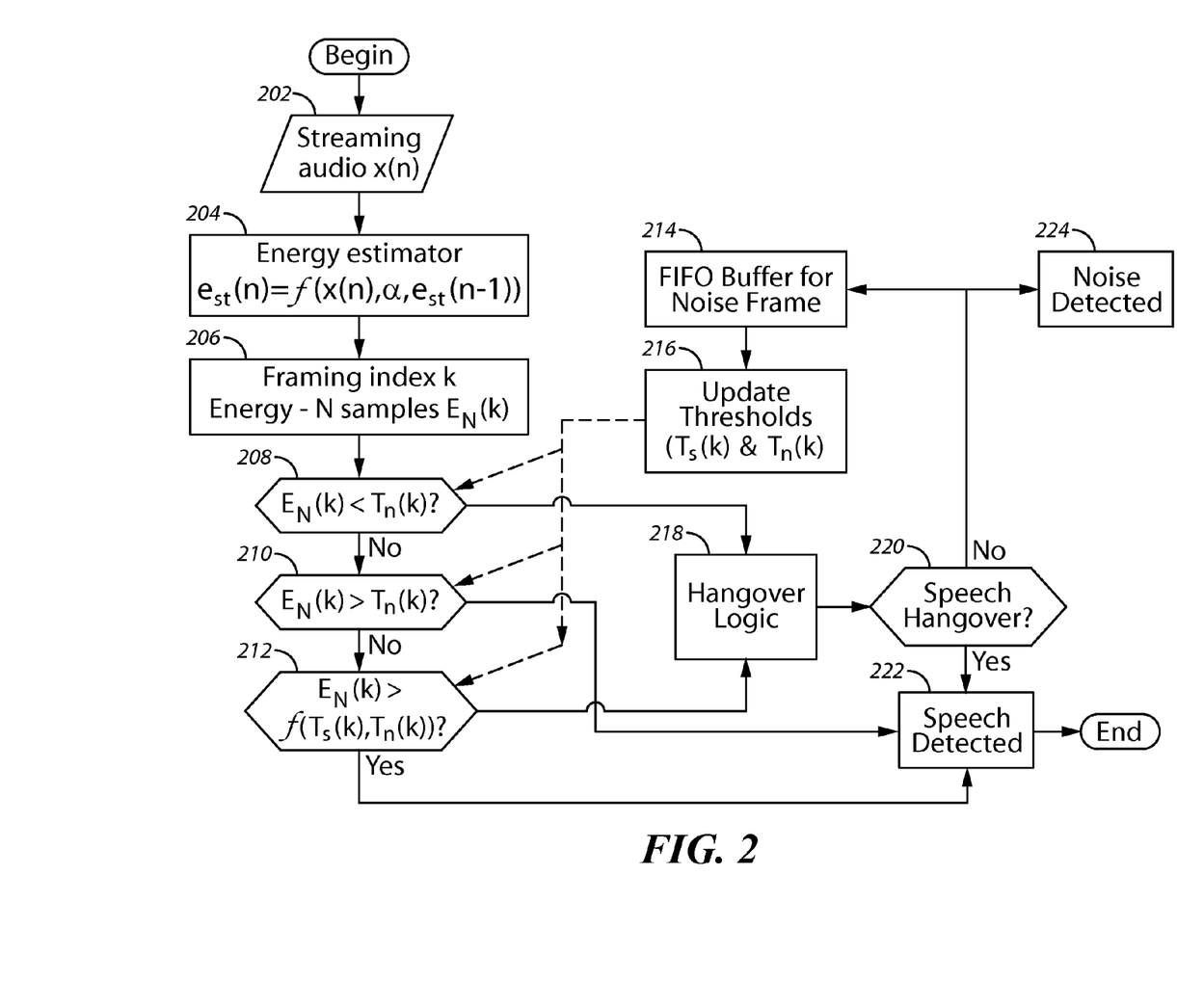
FIG. 2 comprises a flow chart of an Acoustic Activity Detection (AAD) module according to various embodiments of the present invention.

Referring now to FIG. 2, the acoustic activity detector (AAD) algorithm (e.g., block 118 of FIG. 1) is described. It will be appreciated that these approaches may be implemented as any combination of computer hardware and software. For example, any of these elements or functions may be implemented as executable computer instructions that are executed on any type of processing device such as an ASIC or microprocessor.

At step 202, streaming audio is received. At step 204, energy estimation may be performed. These signals are in the form of fixed point digital PCM representation of the audio signal. In one example, a leaky integrator or a single pole filter is used to estimate the energy of the signal in a sample by sample basis. This may be based on absolute value of the signal sample. The following equation may be used:

$$e_{st}(n) = (1-\alpha) \times e_{st}(n-1) + \alpha \times |x(n)|$$

Alternatively, a squared value may be used:

$$e_{st}(n) = (1-\alpha) \times e_{st}(n-1) + \alpha \times (x(n))^2$$

At step 206, an energy estimate $E_N(k)$ is then made for an entire frame of N samples as shown below.

$$E_N(k) = \sum_n e_{st}(n)$$

Other examples are possible.

At steps 208, 210, and 212 the frame energy $E_N(k)$, is then compared to various thresholds (as shown in FIG. 2) in a decision tree to arrive at a conclusion of whether speech is detected (v(k)=1) or not (v(k)=0). A hangover logic block is shown at step 218, which uses a non-linear process to determine how long the speech detection flag should be held high after immediately the detection of an apparent non-speech frame. The hangover logic block 218 helps connect discontinuous speech segments caused by pauses in the natural structure of speech by means of the hangover flag H(k). It also captures the tail ends of words that occur with lower energy and may fall below the detection threshold. An example implementation of the hangover flag is shown in the following equation, though there are other methods that may be derived from this approach or that are similar.

$$H(k) = \begin{cases} 1, & v(k) = 0 \text{ and } \sum_{m=M}^{m} v(i) = M + 1 \forall m \in \{k-K, \ldots, k-1\} \\ 0, & \text{otherwise} \end{cases}$$

At step 220 it is determined if there is a speech hangover. If the answer is affirmative, then execution continues at step 222. If the answer is negative, noise is detected at step 224 and step 214 is executed as described above.

In the event that a frame is declared to be non-speech, it is inserted into a First-in First-out (FIFO) buffer for estimation of the average noise level $\mu_N$, and the standard deviation of the noise level $\sigma_N$. In the following examples, let the contents of the FIFO buffer be terms the energies of the last M frames declared as non-speech $E_N(b)$. Then:

$$\mu_N(k) = \sum_b^M E_N(b)$$

Similarly the standard deviation may be estimated as:

$$\sigma_N(k) = \sqrt{\sum_b [E_N(b) - \mu_N(k)]^2}$$

For computational and hardware efficiency, the frame energy is used in a leaky integrator process to estimate the mean of the noise $\mu_N$ as follows:

$$\mu_N(k) = (1-\beta) \times \mu_N(k-1) + \beta \times E_N(k)$$

Similarly, the standard deviation $\sigma_N$ may be estimated as follows:

$$\sigma_N(k) = (1-\gamma) \times \sigma_N(k-1) + \gamma \times |E_N(k) - \mu_N(k)|$$

The $T_s$ and $T_n$ thresholds are adaptively updated at steps 214 and 216 based on noise statistic from frames in the noise buffer. An estimator for the noise statistics used for calculating thresholds is shown below based on the mean $\mu_N$ and the standard deviation $\sigma_N$ of the frame noise levels estimated.

$$T_n(k) = c \times \mu_N b \times \min(\sigma_N, d)$$

The parameters "a", "b", "c", "d", and "e" are determined empirically to give the desired performance. The minimum function establishes a maximum value for the update.

The speech threshold is derived as:

$$T_s(k) = \min(\alpha \times T_n(k), T_n(k) + C) + e$$

Here the minimum function avoids excessive range of the speech threshold.

If any of the tests performed at steps 208, 210, and 212 are not met, then hangover logic 218 is utilized as described above. If the answers to any of these steps are affirmative, then at step 222 speech is detected and execution ends. Since speech has been detected, an indication that speech has been detected as well as the speech itself can be sent to appropriate circuitry for further processing.

Figure 3:
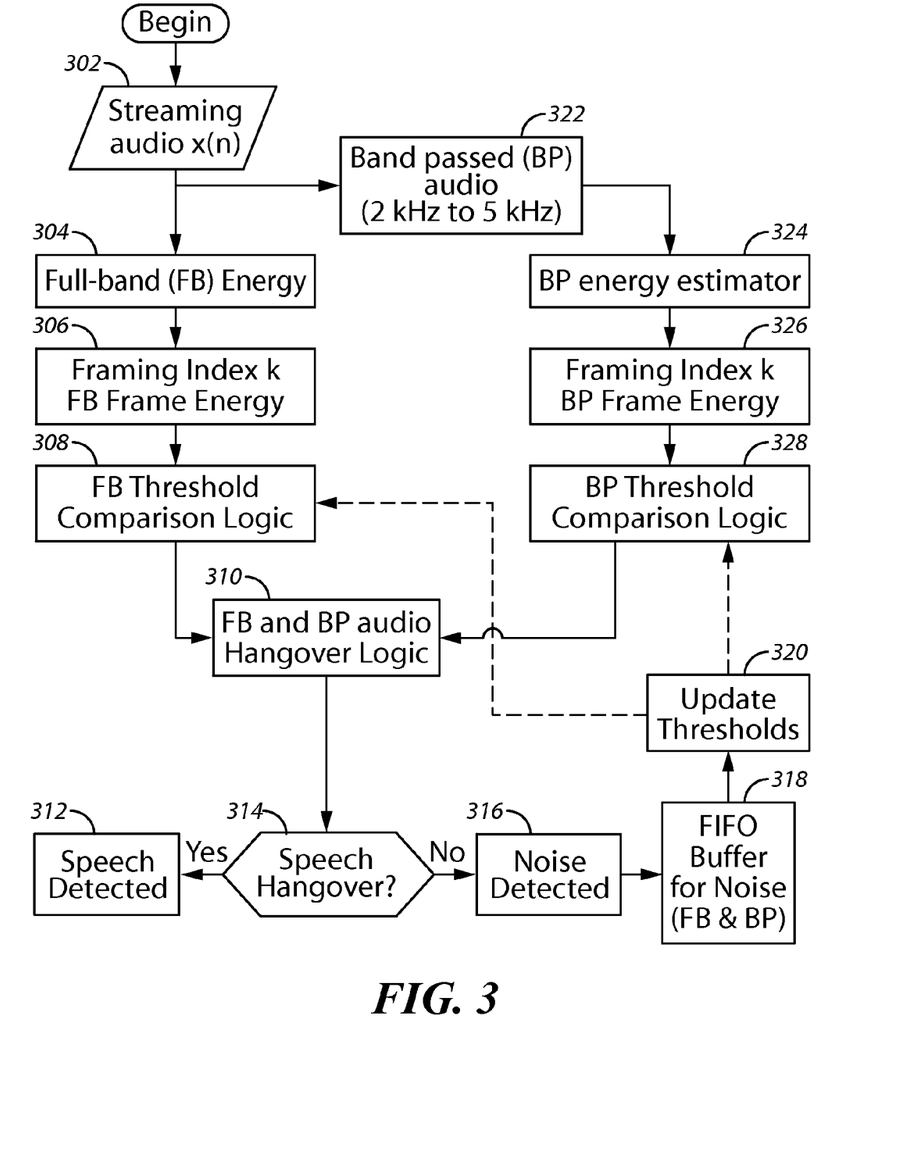
FIG. 3 comprises a flow chart of another example of an Acoustic Activity Detection (AAD) module according to various embodiments of the present invention.

Referring now to FIG. 3, another implementation may be derived based on similar principles, with the aim of lower latency detection of non-vocal fricatives and sibilants. These sounds are characterized by relatively low energy frequency distributions which are more akin to short bursts of band-passed noise. As with the example of FIG. 2, it will be appreciated that these approaches may be implemented as any combination of computer hardware and software. For example, any of these elements or functions may be implemented as executable computer instructions that are executed on any type of processing device such as an ASIC or microprocessor.

The principle of the algorithm is similar to that shown in the algorithm of FIG. 2 except that a parallel path for energy estimation and detection logic is established using high frequency speech energy in the band from, for example, approximately 2 kHz-5 kHz to capture fricative and sibilant characteristics. Several efficient methods exist to implement the band-pass filter as required. The outputs of the threshold based detection drives the hangover logic block to determine speech or non-speech frames. Equations similar to those used in FIG. 2 may also be used.

More specifically, at step 302 an audio signal is received. At step 304, energy estimation may be performed. At step 306, an energy estimate is then made for an entire frame of N samples.

At step 308, the energy is then compared to various thresholds to arrive at a conclusion of whether speech is detected or not. Execution continues at step 310.

In parallel, at step 322, energy estimation may be performed for band pass frequencies (e.g., approximately 2 kHz-5 kHz). At step 324, an estimate of band pass energy is made. At step 326, an energy estimate is then made for an entire frame of N samples. At step 328, the energy is then compared to various thresholds to arrive at a conclusion of whether speech is detected or not. Execution continues at step 310.

A hangover logic block is shown at step 310, which uses a non-linear process to determine how long the speech detection flag should be held high after immediately after the detection of an apparent non-speech frame. The hangover logic block 310 helps connect discontinuous speech segments caused by pauses in the natural structure of speech.

At step 314 it is determined if there is a speech hangover. If the answer is affirmative, then execution continues at step 312 (speech is detected). If the answer is negative, noise is detected at step 316. At step 318 FIFO buffer stores the noise. At step 320, the thresholds are updated.

The detection results for the algorithm shows good performance on a database of several hours of speech with changing ambient noise. The SNR varies from about 20 dB to 0 dB. The database has sentences in noise separated by periods of background noise only.

For purpose of the application, the detection of the onset of speech is accomplished with the lowest possible latency. Speech onset is not missed. For low power requirements, false triggers are minimized. With these goals in mind, results of implementing and executing the algorithm were evaluated according to two principles: low latency detection of the first spoken word in every segment of speech, and the actual accuracy of the detection over all the speech sections in the database. The measures used are standard measures in Hypothesis Testing as defined below:

|  | actual value | |  |
|---|---|---|---|
|  | p | n | total |
| prediction outcome  p' | True Positive | False Positive | P' |
| prediction outcome  n' | False Negative | True Negative | N' |
|  total | P | N |  |

A. True positive rate $$TPR = \frac{TP}{P}$$

B. False positive rate $$FPR = \frac{FP}{N}$$

C. Accuracy $$ACC = \frac{TP + TN}{P + N}$$

Figure 4:
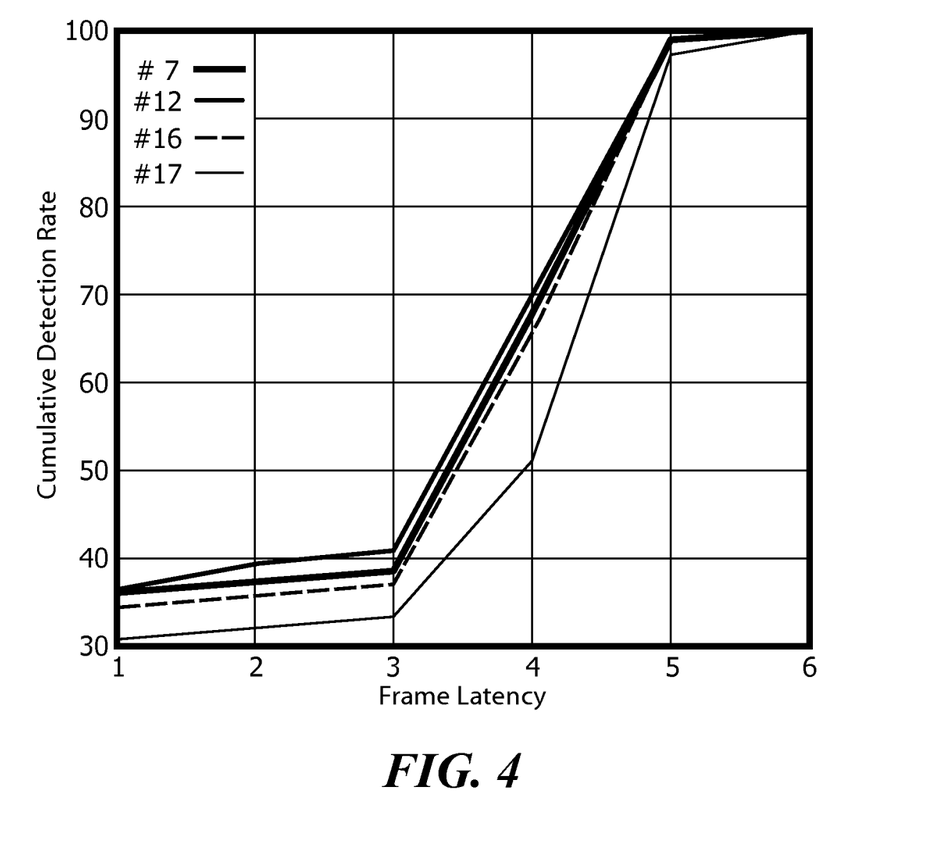
FIG. 4 comprises a graph showing one example of operation of the approaches described herein according to various embodiments of the present invention.

One important parameter for the AAD algorithm is the true positive rate of detection of the first occurrence of speech in a segment. This statistic is in part used to determine how quickly the detector responds to speech. FIG. 4. shows that speech is always detected by the sixth frame for several suitable set of parameters.

Table 1 shows overall accuracy rates along with true positive rate and false positive rate. The low false positive rate indicates that the algorithm is power efficient.

|  | TPR | FPR | ACC |
|---|---|---|---|
| Performance | 96% | 21% | 82% |

Table 1: Overall Performance of One Example Speech AAD Detector Approach

Preferred embodiments of this invention are described herein, including the best mode known to the inventors for carrying out the invention. It should be understood that the illustrated embodiments are exemplary only, and should not be taken as limiting the scope of the invention.

What is claimed is:

1. A method of detecting human speech, the method comprising:
   receiving streaming audio at a transmitter, the streaming audio comprising a sequence of frames, each having a plurality of samples;
   obtaining an energy estimate for each frame of the sequence of frames;
   for each of the plurality of frames, comparing the energy estimate to at least one threshold;
   based upon the comparing, determining whether speech or noise is detected;
   updating the at least one threshold when noise is detected and not updating the at least one threshold when speech is detected, the at least one threshold being determined at least in part by determined statistics from the noise, that are independent of the type of noise;
   when speech is detected, sending an interrupt signal to a voice trigger module and a first control signal to the transmitter, the first control signal being effective to cause the transmission of the streaming audio from the transmitter to the voice trigger module, and the interrupt being effective to wake up the voice trigger module from a low power sleep state;
   when noise is detected, sending a second control signal to the transmitter, the second control signal being effective to stop the transmission of the streaming audio from the transmitter to the voice trigger module, and disabling the interrupt signal to the voice trigger module, the disablement of the interrupt signal being effective to allow the voice trigger module to return to the low power sleep state.

2. The method of claim 1, further comprising determining whether a speech hangover has occurred.

3. The method of claim 2, wherein determining whether a speech hangover occurrence utilizes a non-linear process, wherein the hangover is controlled by a first input and a second input, the first input being from an energy comparison with a noise threshold, and the second input being from an energy comparison with a non-linear function of the combination of the noise and speech threshold.

4. A method, the method comprising:
receiving streaming audio at a transmitter, the streaming audio comprising a sequence of frames, each with a plurality of samples;
obtaining a first energy estimate for the frame and a second energy estimate for the band passed signal, the band passed signal having a frequency of approximately 2 kHz to 5 kHz such that the band passed signal captures the sibilant and fricative characteristics of the speech, the band passed signal being from the same frame of the plurality of samples;
in a first path, comparing the first energy estimate of the full band signal to at least one first threshold and based upon the comparing, determining whether speech or noise is detected;
in a second path performed in parallel with the first path, comparing the second energy estimate from the band passed signal to at least one second threshold and based upon the comparing, determining whether speech or noise is detected;
in each of the first path and the second path, updating the at least one threshold when noise is detected and not updating the at least one threshold when speech is detected, the at least one threshold being determined at least in part by determined statistics from the noise that are independent of the type of noise;
in each of the first path and the second path, when speech is detected, sending an interrupt signal to a voice trigger module and a first control signal to the transmitter, the first control signal being effective to cause the transmission of the streaming audio from the transmitter to the voice trigger module, and the interrupt being effective to wake up the voice trigger module from a low power sleep state;
in each of the first path and the second path, when noise is detected, sending a second control signal to the transmitter, the second control signal being effective to stop the transmission of the streaming audio from the transmitter to the voice trigger module, and disabling the interrupt signal to the voice trigger module, the disablement of the interrupt signal being effective to allow the voice trigger module to return to the low power sleep state.

5. The method of claim 4, further comprising determining whether a speech hangover has occurred.

6. The method of claim 5, wherein determining whether a speech hangover occurred utilizes a non-linear process, wherein the hangover is controlled by a first input and a second input, the first input being from an energy comparison with a noise threshold, and the second input being from an energy comparison with a non-linear function of the combination of the noise and speech threshold.

7. An apparatus configured to distinguish speech activity from background noise, the apparatus comprising:
an analog sub-system that converts sound energy into an analog electrical signal;
a conversion module coupled to the analog system that converts the analog signal into a digital signal;
a transmitter module;
a digital sub-system coupled to the conversion module, the digital sub-system including an acoustic activity detection (AAD) module, the AAD module configured to receive the digital signal, the digital signal comprising a sequence of frames, each having a plurality of samples, the AAD module configured to obtain an energy estimate for the plurality of samples and compare the energy estimate to at least one threshold, and the AAD module configured to based upon the comparison, determine whether speech or noise is detected, and when speech is detected transmit an interrupt to a voice trigger module and a first control signal to the transmitter module, the first control signal being effective to cause the transmission of the streaming audio from the transmitter module to the voice trigger module, and the interrupt being effective to wake up the voice trigger module from a low power sleep state, the AAD module being configured to when noise is detected, send a second control signal to the transmitter module, the second control signal being effective to stop the transmission of the streaming audio from the transmitter module to the voice trigger module, and to disable the interrupt signal being sent to the voice trigger module, the disablement of the interrupt signal being effective to allow the voice trigger module to return to the low power sleep state, the AAD module being configured to update the at least one threshold when noise is detected and not update the at least one threshold when speech is detected, the at least one threshold being determined at least in part by determined statistics from the noise independent of the type of noise.

8. The apparatus of claim 7, wherein the analog sub-system includes a micro-electro-mechanical system (MEMS) transducer element.

9. The apparatus of claim 7, wherein the AAD module is further configured to determine whether a speech hangover has occurred.

10. The apparatus of claim 7, wherein the conversion module comprises a sigma-delta modulator that is configured to convert the analog signal into a single bit stream pulse density modulated (PDM) format.

11. The apparatus of claim 10, wherein the digital sub-system comprises a decimator module that converts the single bit stream pulse density modulated (PDM) format into a pulse code modulated (PCM) format.

12. The apparatus of claim 11, wherein the pulse code modulated (PCM) audio from the decimator module is stored continuously in a circular buffer and in parallel, also provided to the AAD module for processing.

13. The apparatus of claim 11, wherein the AAD module enables the transmission of the digital signal by a transmitter module upon the detection of speech, and wherein the transmitter module comprises a interpolator and digital sigma-delta modulator, that converts the pulse code modulated (PCM) format back to a single bit stream pulse density modulated (PDM) format.

* * * * *